April 17, 1956  W. R. KING  2,741,796
FEEDING MECHANISM
Filed Jan. 2, 1952
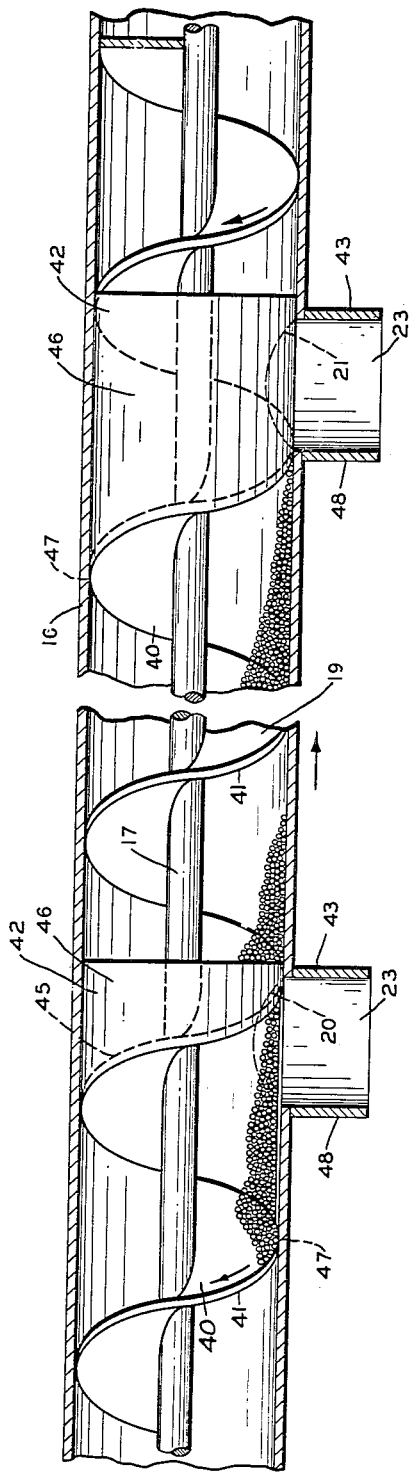
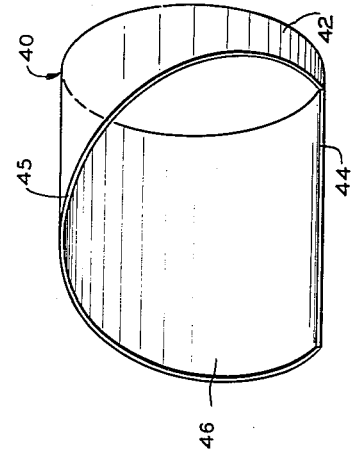
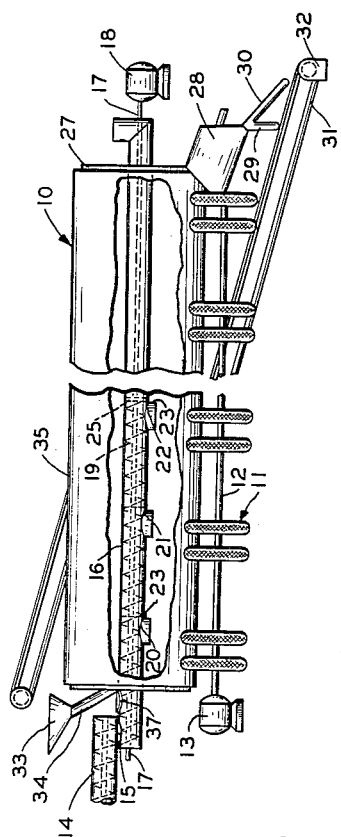
INVENTOR.
W. R. KING
BY
Hudson & Young
ATTORNEYS

United States Patent Office 2,741,796
Patented Apr. 17, 1956

2,741,796

FEEDING MECHANISM

William R. King, Borger, Tex., assignor to Phillips Petroleum Company, a corporation of Delaware Application January 2, 1952, Serial No. 264,430

7 Claims. (Cl. 18—1)

This invention relates to mechanism for feeding granular material. In another aspect, it relates to a process for pelleting carbon black.

Carbon black is produced in the furnace process by the incomplete combustion of carbonaceous material, such as a heavy gas oil, the carbon black being separated from the combustion gases after the reaction is completed. As it comes from the separation device, the carbon black is in a fluffy flocculent condition, and has a bulk density of approximately four pounds per cubic foot. In this condition, the black is extremely difficult to handle or package, and the bulk of the package required for holding a given weight of black is too great to permit economical shipment. Accordingly, before shipping or handling, the carbon black is subjected to a treatment whereby its density is increased.

A commercially successful and extremely satisfactory treatment of this type is the formation of the flocculent carbon black into relatively hard dense pellets. Such pellets may have a bulk density of as high as twenty-five to thirty pounds per cubic foot, as compared to approximately four pounds per cubic foot for the flocculent black. Therefore, in the form of pellets, the bulk of a package required for holding a given weight of black is substantially decreased. Further, due to the aggregation of the flocculent particles, there is little dust formation when the carbon black pellets are handled. Dust formation is a serious and annoying problem when an attempt is made to handle or package the carbon black in its flocculent condition.

One very satisfactory method of forming pellets of carbon black is to introduce the material into a rotating cylindrical mill wherein there is a gentle "cascading" or rolling and tumbling action as the carbon black particles elevated by rotation of the mill roll and tumble transversely across the sloping surface of the bed in the mill. The resulting carbon black pellets are removed from the outlet end of the mill for packaging or shipment in tank cars. In most cases it is advantageous, and in some cases it is essential that a portion of the product pellets be recycled to the inlet end of the mill. Although the exact mechanism of the action of the recycled pellets is not known, it is believed that they are broken up in the mill into smaller sizes and serve as nuclei for the formation of larger pellets from the flocculent black charge to the mill.

In many cases, it has been found desirable to introduce the flocculent black to the mill at a plurality of points spaced longitudinally within the pellet mill. This has been done by the use of a plurality of screw conveyors each extending a different distance into the pellet mill. A disadvantage of this type of structure is that the opening at the inlet end of the mill must, in this case, be sufficiently large as to accommodate the plurality of screw conveyors. This creates a rather difficult sealing problem at the inlet end of the mill and prevents the bed depth in the mill from exceeding the radial distance from the outer circumference of the mill to the outer edge of the opening. In other cases, it has been proposed to utilize a single screw in such conveyors, a plurality of longitudinally spaced openings being provided in the tube surrounding the conveyor, each opening being in the bottom part of the tube. Difficulties have been experienced with this type of conveyor mechanism resulting from clogging of the openings by masses of flocculent carbon black.

It is a major purpose of this invention to provide a structure wherein the black is fed to the mill through a single conveyor and distributed at various longitudinally spaced zones within the mill with elimination of difficulties resulting from clogging.

Further, where recycle pellets are utilized, it has previously been customary to introduce the pellets and flocculent black through separate feeding mechanism located at the inlet end of the mill. One or a plurality of screw conveyors were utilized to feed the flocculent black into the mill while the recycle pellets were passed through a separate pipe or conveyor extending through the inlet end of the mill. It has been found highly advantageous to mix together the recycle pellets and flocculent black, the mixture being introduced into the mill through a single conveyor device, which may distribute the mixture of flocculent black and pellets at a plurality of longitudinally spaced regions within the mill. To this end, I have devised a feeding mechanism for cooperation with such a pellet mill and its recycling device.

My novel feeding mechanism eliminates clogging of the discharge openings by masses of carbon black and permits regulation of the proportion of material fed through each discharge opening from the conveyor tube. Further, the feeding mechanism of my invention is well adapted for use in mills where the recycle pellets and flocculent black are mixed together before they are introduced into the mill.

Although I have referred hereinbefore to a process for pelleting carbon black, it will be understood that the various types of feeding mechanism coming within the scope of the invention have independent utility in other applications, particularly in the transporation of granular material.

It is an object of the invention to provide improved mechanism for feeding and distributing granular material.

It is a further object to provide an improved process and apparatus for the pelleting of carbon black.

It is a still further object to provide such a process and apparatus at a low cost and to permit the use of a higher bed depth in a pellet mill.

Various other objects, advantages and features of the invention will become apparent from the following detailed description taken in conjunction with the accompanying drawings, in which:

Figure 1 is a front elevational view, partially broken away, of a carbon black pelleting mill utilizing the feeding mechanism of my invention;

Figure 2 is an enlarged sectional view, partially in elevation, of the feeding mechanism; and Figure 3 is a perspective view of a wrapping plate used in connection with the novel feeding mechanism.

Referring now to the drawings in detail and particularly to Figure 1, a horizontally disposed generally cylindrical pellet mill 10 is supported by two sets of rubber tires, one of which is shown at 11, each set being mounted upon a shaft 12 journaled in a suitable support, not shown, and driven by a motor 13. Flocculent carbon black is introduced into mill 10 from a conveyor 14 which has a discharge opening cooperating with a feed opening 15 in a non-rotatable tube 16 mounted axially within the mill 10. This tube may, if desired, carry suitable scrapers, not shown for removing deposits of carbon black from the inner surface of the mill. A shaft 17 driven by a motor 18 is mounted axially within the tube 16, and this shaft carries a helical screw conveyor blade 19 which carries the flocculent carbon black from the feed opening 15 to a plurality of discharge openings 20, 21 and 22 mounted in the bottom of the tube from which the flocculent black is discharged through depending drop out boxes 23 into the mill. It will be understood that the word "tube," as used herein, comprehends a trough or other similar structure for guiding the material to be conveyed.

Just downstream of the innermost discharge opening 22, a disk 25 is carried by shaft 17 to prevent black from flowing into the unused downstream portion of the tube. Where the mill is forty-eight feet in length, discharge opening 20 can be positioned eighteen inches downstream of the inlet end of the mill, discharge opening 21 can be positioned six feet downstream of the inlet end of the mill, and discharge opening 22 can be positioned twelve feet downstream from the inlet end of the mill.

In accordance with the invention, a wrapping sleeve of novel design is secured to the conveyor blade adjacent each of the discharge openings 20 and 21, which sleeve will be hereinafter described in detail. In this manner, a regulated flow of black is introduced through each of the discharge openings into the mill wherein it is formed into pellets by the gentle rolling and tumbling action caused by rotation of the mill at a regulated rate of speed. The pellets are removed from the outlet end 27 of the mill from which they pass to a distributing device 28, a portion of the pellets being withdrawn as product by a conduit 29, and the remainder of the pellets passing through a conduit 30 to an endless belt 31 driven by a motor 32. The last-mentioned pellets pass upwardly along the belt and are discharged through a hopper 33 and a conduit 34 into the inlet end 35 of the mill. Although, with certain types of black, the maintenance of a critical recycle ratio is important, with other types of black the recycle can be eliminated. In some cases, it is very advantageous to mix the recycle pellets with the flocculent black before introduction of the material into the mill. Where this is done, the hopper 33 and conduit 34 can be eliminated, the recycle pellets from the belt 31 passing through a suitable conveying device to a second feed opening 37 in the tube 16, as explained in more detail in the copending application of Larson et al., Serial No. 268,644, filed March 19, 1952, entitled Feeding Mechanism. In further accordance with the teaching of the aforesaid copending application, the recycle pellets can be introduced through the tube 16 into the inlet end 35 of the mill while the flocculent black is introduced through the tube 16 from the outlet end 27 of the mill. The novel feeding mechanism of this invention is applicable where it is desired to distribute the black passing through the tube from outlet end 27 of the mill to a plurality of regions of the pellet bed within the mill.

The novel feeding mechanism of this invention is shown in more detail in Figure 2, in which the parts already described are indicated by like reference numerals. Adjacent each discharge opening 20, 21 except the innermost one 22, a metal wrapping sleeve 40, Figures 2 and 3, is wrapped around and secured to the outer edge 41 of the conveyor blade 19. The sleeves 40 are of similar construction but are shown as displaced 180° from each other for purposes of clarity. Each sleeve has a cylindrical base portion 42 extending downstream a short distance from the downstream edge 43 of the associated drop out box 23. The length of this portion is not critical and it may, in some cases, be eliminated. The remainder of the wrapping sleeve is of cylindrical shape but it has a cut out portion corresponding to the contour of the outer edge 41 of conveyor blade 19. Thus, the cut out portion is defined by an edge 44 parallel to the axis of cylinder 42 and of the shaft 17 together with an edge 45 of helical contour which is fitted to and secured against the outer edge 41 of the conveyor blade 19. The edges 44, 45 define a tapered body portion 46 which extends to a position 47 upstream of the upstream edge 48 of the adjacent drop out box 23.

During each revolution of the conveyor 19, the tapered body portion 46 covers up the drop out box 23 during a portion thereof and uncovers the drop out box 23 during the remainder thereof. When the drop out box 23 is uncovered, the granular material, such as carbon black, carried by the conveyor is discharged therethrough. During the remainder of the revolution, while the drop out box 23 is covered, the material is conveyed downstream beyond the drop out box by the action of the wrapping plate 40. In this connection, it will be noted that the sleeve 40 and blade 19 operate similarly to an Archimedian screw to convey the material downstream without permitting it to pass into the drop out box 23. The proportion of the total feed discharged through opening 20, for example, is dependent upon the ratio of the distance from the point 47 to the downstream edge 43 of the drop out box to the distance between the upstream and downstream edges 43, 48 thereof. The greater this ratio, the smaller the proportion of material discharged through the opening 20. In particular, if the distance 43, 47 is one pitch, that is, 360° of the helical screw, and the distance 43, 48 is one half pitch, then approximately one half the material carried by the screw will be discharged through opening 20 and one half the remainder of the material will be discharged through opening 21. The remainder of the material passes downstream to the opening 22, Figure 1, which is not provided with a wrapping sleeve so that all the remaining material is discharged at this opening.

It will be apparent that the wrapping sleeve 40 performs three important functions. First, the edge 44 scoops up a portion of the material; second, the body portion 46 covers the drop out box during part of each revolution to prevent discharge therethrough; and, third, the wrapping sleeve causes the material to be conveyed past the drop out box by the principle of the Archimedian screw and deposits it in position to be moved further downstream by the standard conveyor blade.

In the pelleting of carbon black, a very important advantage results in that the drop out box can be made quite large and yet the proportion of material discharged therethrough can be accurately regulated. The relatively large size of the discharge box is quite effective in preventing clogging thereof by particles of flocculent black and by pellets, in cases where pellets are conveyed by the unit. Further, the control of the proportion of material discharged is effected in a very direct and simple manner with the result that the control device is very simple in construction and installation.

While the invention has been described in connection with a present, preferred embodiment thereof, it is to be understood that this description is illustrative only and is not intended to limit the invention.

I claim:

1. Feeding mechanism comprising, in combination, an elongated tube, a discharge opening in said tube, a screw conveyor having a helical blade mounted within said tube, and a sleeve secured to the outer edge of said blade adjacent said discharge opening, said sleeve forming an inner tube mounted within and concentric with said elongated tube and having one end thereof cut away to fit the contour of said conveyor blade, said sleeve being arranged to cover up said discharge opening during a portion of each complete rotation of said conveyor and to open said discharge opening during the remainder of said complete revolution.

2. Feeding mechanism comprising, in combination, an elongated tube, a discharge opening cut in the bottom of said tube, a drop out box depending from said tube and alined with said discharge opening, a screw conveyor having a helical blade mounted within said tube, and a sleeve secured to the outer edge of said blade adjacent said discharge opening, said sleeve forming an inner tube mounted within and concentric with said elongated tube and having one end thereof cut away to fit the contour of said conveyor blade, said sleeve being arranged to cover up said discharge opening during a portion of each complete rotation of said conveyor and to open said discharge opening during the remainder of said complete revolution.

3. Feeding mechanism comprising, in combination, an elongated tube, a discharge opening cut in the bottom of said tube, a drop out box depending from said tube and alined with said discharge opening, a screw conveyor mounted within said tube having a helical blade, and a metal wrapping sleeve mounted upon and affixed to the outer edge of said blade adjacent said discharge opening so as to cover said discharge opening during a portion of each revolution of said conveyor and to open said discharge opening during the remainder of such complete revolution.

4. Feeding mechanism comprising, in combination, an elongated tube, a shaft mounted axially therein, a helical conveyor blade secured to said shaft and extending through said tube, and a pair of spaced discharge openings in said tube, each discharge opening having associated therewith a sleeve secured to the outer edge of said conveyor blade, said sleeve forming an inner tube mounted within and concentric with said elongated tube and having one end thereof cut away to fit the contour of said conveyor blade, said sleeve being arranged so as to cover up said discharge opening during a portion of each complete rotation of said conveyor and to open said discharge opening during the remainder of said complete revolution.

5. Feeding mechanism comprising, in combination, an elongated tube, a shaft mounted axially therein, a helical conveyor blade secured to said shaft and extending through said tube, a pair of spaced discharge openings in said tube, each discharge opening having associated therewith a metal wrapping sleeve carried by and affixed to the outer edge of said helical blade, each sleeve having a cylindrical base portion extending downstream from the downstream edge of the associated discharge opening and a cut away portion upstream of said cylindrical portion shaped in accordance with the contour of said conveyor blade, said cut away portion extending upstream from the upstream edge of the associated discharge opening whereby said wrapping sleeve covers the associated discharge opening during a portion of each revolution of the conveyor and uncovers said discharge opening during the remainder of said complete revolution, the ratio between the length of the cut away portion and the length of its associated discharge opening controlling the proportion of each revolution during which the discharge opening is uncovered and thereby the proportion of material discharged therethrough.

6. Feeding mechanism comprising, in combination, an elongated tube, a shaft mounted axially therein, a helical conveyor blade secured to said shaft and extending through said tube, a pair of spaced discharge openings in the bottom of said tube, a drop out box depending from each discharge opening, each discharge opening having associated therewith a metal wrapping sleeve carried by and affixed to the outer edge of said helical blade, each sleeve having a cylindrical base portion extending downstream from the downstream edge of the associated drop out box and a cut away portion upstream of said cylindrical portion shaped in accordance with the contour of said conveyor blade, said cut away portion extending upstream from the upstream edge of the associated drop out box whereby said wrapping sleeve covers the associated drop out box during a portion of each revolution of the conveyor and uncovers said drop out box during the remainder of said complete revolution, the ratio between the length of the cut away portion and the length of its associated drop out box controlling the proportion of each revolution during which the drop out box is uncovered and thereby the proportion of material discharged therethrough.

7. A metal wrapping sleeve for a screw conveyor comprising a cylindrical plate having a cut out portion therein, one edge of said cut out portion being parallel to the axis of said sleeve and the other edge of said cut out portion having a helical contour corresponding to the contour of a screw conveyor blade.

References Cited in the file of this patent
UNITED STATES PATENTS 2,571,637  Weist _____ Oct. 16, 1951

FOREIGN PATENTS 713,153  Germany _____ Oct. 9, 1941
638,863  Great Britain _____ June 14, 1950